United States Patent
Igarashi et al.

(10) Patent No.: US 7,808,910 B2
(45) Date of Patent: Oct. 5, 2010

(54) COMMUNICATION TERMINAL, CONGESTION CONTROL METHOD, AND CONGESTION CONTROL PROGRAM

(75) Inventors: Ken Igarashi, Minato-ku (JP); Kenichi Yamazaki, Hino (JP)

(73) Assignee: NTT DoCoMo, Inc., Chiyoda-ku (JP)

( * ) Notice: Subject to any disclaimer, the term of this patent is extended or adjusted under 35 U.S.C. 154(b) by 221 days.

(21) Appl. No.: 12/017,702

(22) Filed: Jan. 22, 2008

(65) Prior Publication Data

US 2008/0181109 A1    Jul. 31, 2008

(30) Foreign Application Priority Data

Jan. 24, 2007    (JP)    ............... 2007-013611

(51) Int. Cl.
*H04J 1/16*    (2006.01)
(52) U.S. Cl. ..................................... 370/236
(58) Field of Classification Search ................. 370/229, 370/230, 231, 235, 236
See application file for complete search history.

(56) References Cited

U.S. PATENT DOCUMENTS

| 2002/0150048 | A1 | 10/2002 | Ha et al. | |
|---|---|---|---|---|
| 2003/0046336 | A1* | 3/2003 | D'Annunzio et al. | 709/203 |
| 2005/0286416 | A1* | 12/2005 | Shimonishi et al. | 370/229 |
| 2006/0023634 | A1 | 2/2006 | Morandin | |

OTHER PUBLICATIONS

Luigi Alfredo Grieco, et al., "End-to-End Bandwidth Estimation for Congestion Control in Packet Networks", Prc. Quality of Service in Multiservice IP Networks, (QoS-IP 2003, Milano), Feb. 2003.
Mark Allman, "On the Generation and Use of TCP Acknowledgments", Computer Communication Review, ACM, New York, NY, USA, vol. 28, No. 5, Oct. 1, 1998, pp. 4-21, ISSN: 0146-4833, XP000914449.
Shaojian Fu, et al., "SCTP over Satellite Networks", Computer Communications, 2003 IEEE, Oct. 20, 2003, Piscataway, NJ, USA, pp. 112-116, ISBN: 978-0-7803-8239-8, XP010662903.
Thomas R. Henderson, et al., "Transport Protocols for Internet-Compatible Satellite Networks", IEEE Journal on Selected Areas in Communications, IEEE Service Center, Piscataway, USA, vol. 17, No. 2, pp. 326-344, Feb. 1, 1999, ISSN: 0733-8716, XP011054915.

* cited by examiner

*Primary Examiner*—Kwang B Yao
*Assistant Examiner*—Obaidul Huq
(74) *Attorney, Agent, or Firm*—Crowell & Moring LLP

(57) ABSTRACT

The congestion in a network can be avoided by effectively utilizing a prepared network band even in a network where reception intervals of acknowledgments are not correct. According to the information about Ack or Sack (selective acknowledgment) received in a time of the minimum value of an RTT (rtt_min), the number of bytes of received segments (rcv_bytes) for which a receiving side acknowledges the reception is counted, and a received byte number setting unit 16 sets a congestion window (CWND) or a slow start threshold (SSTHRESH) when a packet loss occurs according to the number of bytes of received segments (rcv_bytes) counted by a received byte number counting unit 14 when a packet loss is detected by a loss detection unit 15.

4 Claims, 4 Drawing Sheets

COMMUNICATION TERMINAL, CONGESTION CONTROL METHOD, AND CONGESTION CONTROL PROGRAM

BACKGROUND OF THE INVENTION

1. Field of the Invention

The present invention relates to a communication terminal, a congestion control method, and a congestion control program, and more specifically to a congestion control method in a TCP (transmission control protocol).

2. Description of the Related Art

Recently, in the most widely used TCP in the Internet, congestion control is performed using a congestion window (CWND) when a segment is transmitted to avoid the congestion of a network.

Generally, the congestion control algorithm of a TCP sets a congestion window as described below when a packet loss occurs.

1. At FF (fast retransmit & fast recovery), the following values are set.

$$SSTHRESH=(1-b) \times CWND$$

$$CWND=SSTHRESH$$

2. When RTO (retransmission timeout) occurs, the following values are set.

$$SSTHRESH=(1-b) \times CWND$$

$$CWND=1 \times MSS$$

However, an MSS (maximum segment size) is the maximum segment size that can be transmitted on the transmitting side. A CWND (congestion window) is a TCP state variable for restriction of the permitted transmission size of a TCP. The SSTHRESH (SLOWSTART THRESHOLD) is a slow start threshold.

In a normal TCP, a=1 and b=0.5 are used.

In addition, for example, the non-patent document 1 discloses a method of effectively utilizing network resources after an occurrence of a packet loss by calculating the values of the CWND and the SSTHRESH while estimating the bandwidth in the bottleneck link based on the reception intervals of the Ack (acknowledgment) when a packet loss is detected.

That is, when a packet loss is detected, the values of the CWND and the SSTHRESH are calculated as follows.

$$b_k=d_k/(t_k-t_{k-1}) \quad (1)$$

However, $t_k$ indicates the time when the k-th Ack is received, and $d_k$ indicates the number of bytes of segments for which the receiving side acknowledges the reception.

Then, the moving average of keyboard in the equation (1) is calculated by the equation (2), and $b_k$ in the equation (2) is used as is as the values of the CWND and the THRESH.

$$b_k=19/21 \cdot b_{k-1}+2/21 \cdot (b_k-b_{k-1})/2 \quad (2)$$

[Non-patent Document 1] L. A. Grieco and S. Mascolo: End-to-End bandwidth Estimation for Congestion Control in Packet Networks, Prc. Quality of Service in Multiservice IP Networks (QoS-IP 2003. (Milano), February 2003.

SUMMARY OF THE INVENTION

However, in the congestion control algorithm of the conventional TCP, the CWND is decreased using a segment loss as a trigger and the congestion control is performed. Therefore, if the CWND is not large enough before an occurrence of a packet loss, then the size of the CWND and the SSTHRESH after the occurrence of a packet loss is not sufficient for a network band. Therefore, a prepared network band cannot be effectively utilized.

In the method disclosed by the non-patent document 1, since the values of the CWND and the SSTHRESH are determined from the reception intervals of the Ack, the values of the CWND and the SSTHRESH after the occurrence of a packet loss cannot be set as the optimum values in the network where the reception intervals of the Ack are not correct.

The objective of the present invention is to provide a communication terminal, a congestion control method, and a congestion control program capable of avoiding the congestion in the network while effectively utilizing a prepared network band in the network where the reception intervals of an acknowledgment are not correct.

To solve the above-mentioned problems, the communication terminal according to an embodiment of the invention includes: a received byte number counting unit for counting on a transmitting side the number of bytes of segments for which a receiving side acknowledges the reception of the segments based on an acknowledgment transmitted from the receiving side; and a received byte number setting unit for setting a congestion window or a slow start threshold when a packet loss occurs based on the number of bytes of segments counted by the received byte number counting unit.

The communication terminal according to an embodiment of the present invention includes: a minimum time counting unit for counting the minimum value of an RTT; a received byte number counting unit for counting on a transmitting side the number of bytes of segments for which the receiving side acknowledges the reception of the segments based on an acknowledgment transmitted from the receiving side in a period of the minimum value of an RTT counted by the minimum time counting unit; a loss detection unit for detecting a packet loss based on a retransmission timeout or a duplicate acknowledgment; and a received byte number setting unit for setting a congestion window or a slow start threshold when a packet loss occurs based on the number of bytes of segments counted by the received byte number counting unit.

In an embodiment of the communication terminal of the present invention, at fast retransmission and fast recovery, the received byte number setting unit sets the number of bytes of segments counted by the received byte number counting unit or the half number of congestion windows whichever is larger as a slow start threshold, and sets the slow start threshold in the congestion window; and at retransmission timeout, the received byte number setting unit sets the number of bytes of segments counted by the received byte number counting unit or the half number of congestion windows whichever is larger as a slow start threshold, and sets a maximum segment size that the transmitting side can transmit in the congestion window.

The congestion control method according to an embodiment of the present invention includes: a step of counting on a transmitting side the number of bytes of segments for which a receiving side acknowledges reception of the segments based on the acknowledgment transmitted from the receiving side; and a step of setting a congestion window or a slow start threshold when a packet loss occurs based on the number of bytes of segments counted on the transmitting side.

The congestion control program according to an embodiment of the present invention is used to direct a computer to perform the process including: a step of counting on a transmitting side the number of bytes of segments for which a receiving side acknowledges reception of the segments based on the acknowledgment transmitted from the receiving side; and a step of setting a congestion window or a slow start threshold when a packet loss occurs based on the number of bytes of segments counted on the transmitting side.

As described above, according to the present invention, a congestion window or a slow start threshold when an occurrence of a packet loss can be set based on the number of bytes of the segments for which the receiving side acknowledges the reception, and the value of the congestion window or the slow start threshold after an occurrence of a packet loss can be set to the optimum value of the network. Therefore, even in the network where the reception intervals of an acknowledgment are not correct, the congestion of the network can be avoided while effectively utilizing the prepared network band.

DETAILED DESCRIPTION OF THE PREFERRED EMBODIMENTS

The communication terminal according to an embodiment of the present invention is described below with reference to the attached drawings.

Figure 1:
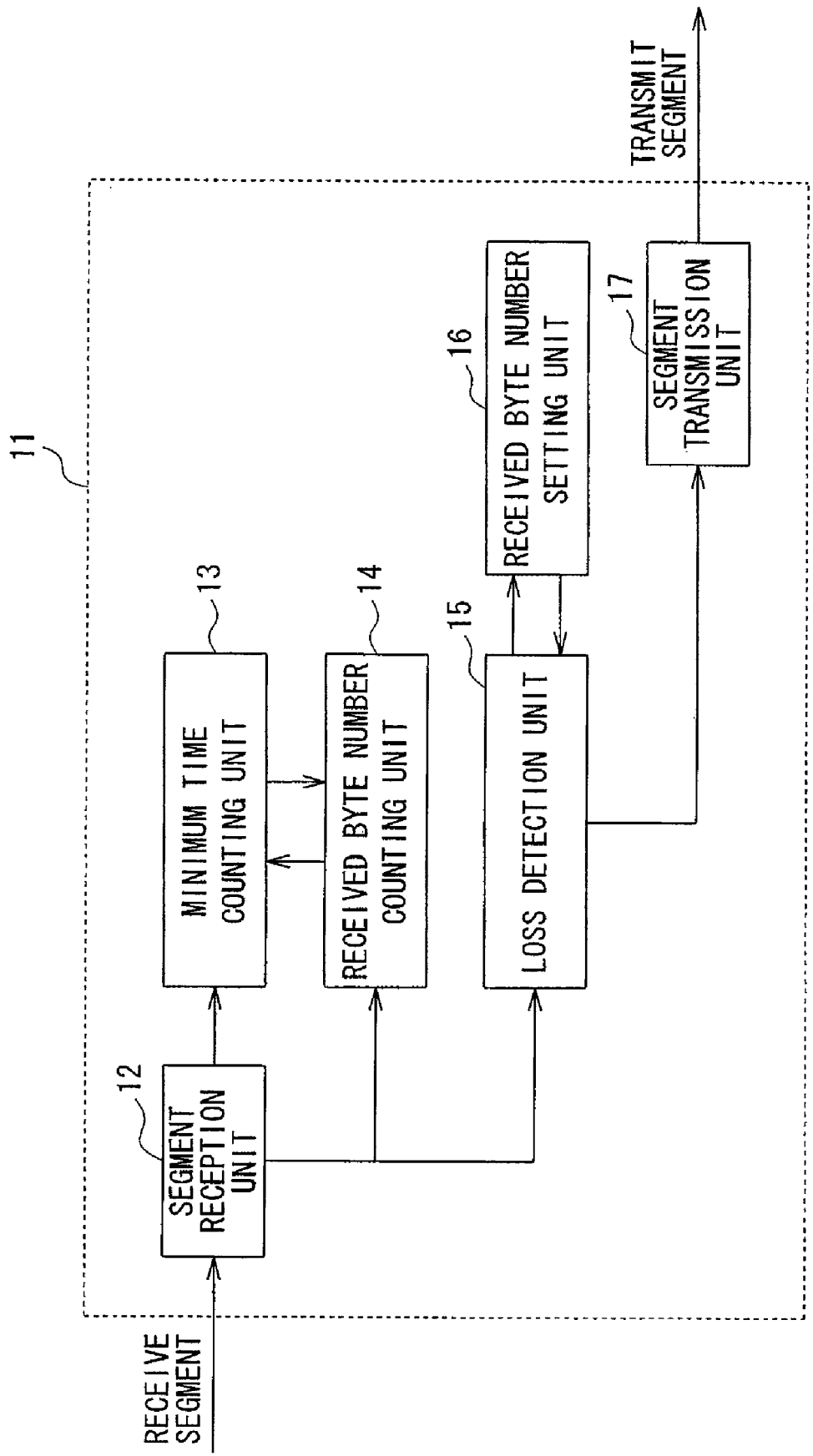
FIG. 1 is a block diagram showing the outline of the configuration of the transmission terminal according to an embodiment of the present invention.

FIG. 1 is a block diagram showing the outline of the configuration of the transmitting terminal according to an embodiment of the present invention.

In FIG. 1, a transmitting terminal 11 includes a segment reception unit 12 for receiving a segment transmitted over a network such as the Internet; a minimum time counting unit 13 for counting the minimum value of an RTT; a received byte number counting unit 14 for counting on a transmitting side the number of bytes of the segments for which the receiving side acknowledges the reception according to the acknowledgment transmitted from the receiving side within the period of the minimum value of the RTT counted by the minimum time counting unit 13; a loss detection unit 15 for detecting a packet loss according to a retransmission timeout a duplicate acknowledgment; a received byte number setting unit 16 for setting a congestion window or a slow start threshold when a packet loss occurs based on the number of bytes of the segments counted by the received byte number counting unit 14; and a segment transmission unit 17 for transmitting a segment over a network such as the Internet.

When the segment reception unit 12 receives a segment transmitted over a network, the unit transmits the segment to the minimum time counting unit 13, the received byte number counting unit 14, and the loss detection unit 15.

Then, the minimum time counting unit 13 can count the RTT as in the method used by the TCP. That is, when a timestamp option is available, the minimum time counting unit 13 can set (current time)−(timestamp echo) as an RTT.

On the other hand, when the timestamp option is not available, the minimum time counting unit 13 can set the value of (current time)−(time when acknowledged segment is transmitted) as an RTT.

The minimum time counting unit 13 continuously counts the RTT while the segment is transmitted, updates the minimum value of an RTT (rtt_min) each time the minimum value of an RTT (rtt_min) is counted, and uses the minimum value of an RTT (rtt_min) as the counting period of the number of bytes of received segments (rcv_bytes).

With the case where the RTT greatly changes due to the switch of a route, the movement of a receiving terminal, etc. taken into account, the minimum value of an RTT (rtt_min) can be set again in the following cases.

(1) When a segment is not transmitted for 1 RTT or more:
In this case, 1 RTT can be RTO (retransmission timeout) counted from the RTT.

(2) When a CWND falls below the initial window size:
Next, when the minimum time counting unit 13 counts the minimum value of an RTT (rtt_min), the received byte number counting unit 14 counts the number of bytes of received segments (rcv_bytes) for which the receiving side acknowledges the reception according to the information about the Ack received within the time of the minimum value of an RTT (rtt_min) or the information about the SAck (selective acknowledgment).

Figure 2:
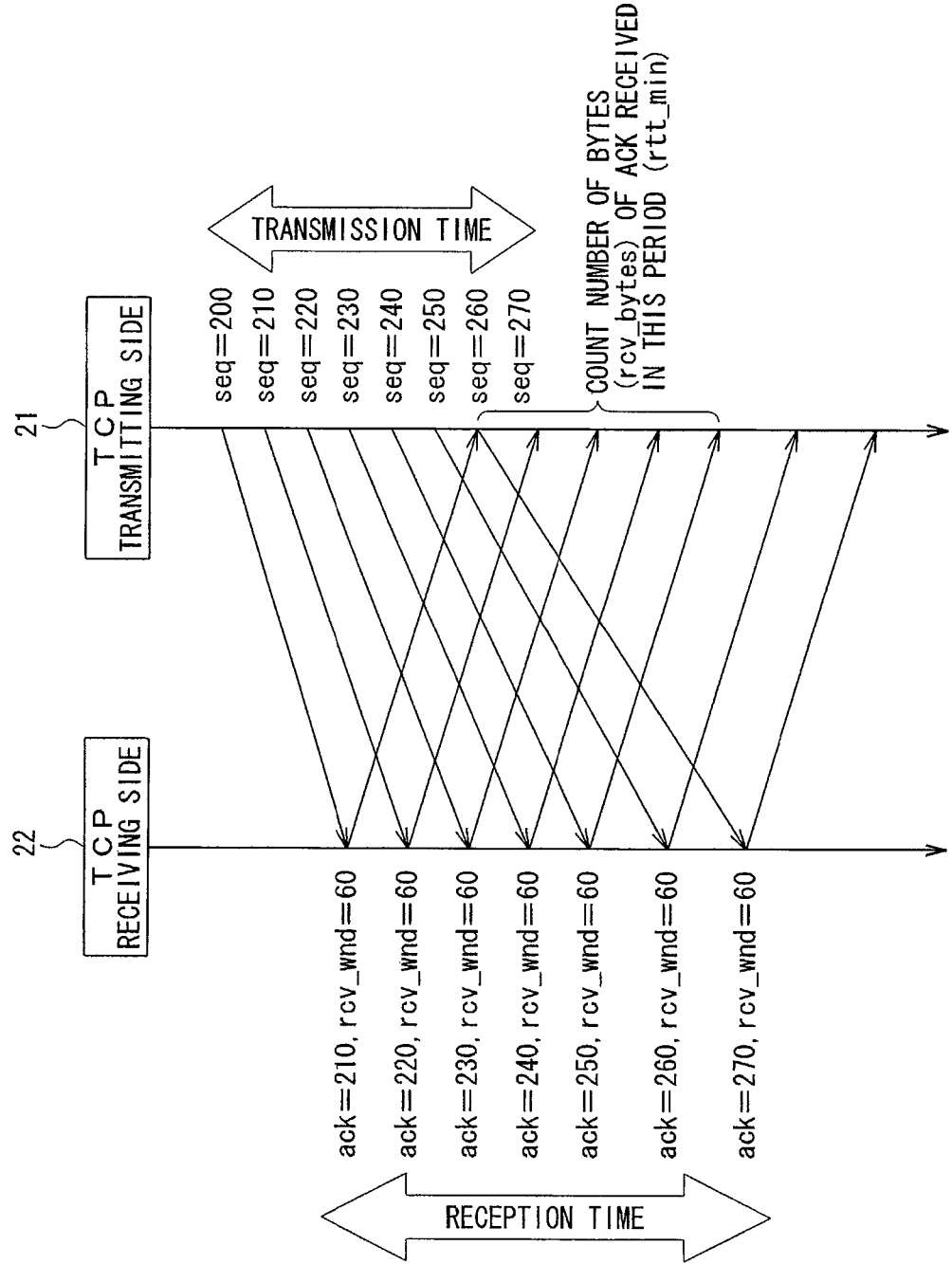
FIG. 2 shows the method of counting the number of bytes of received segments according to an embodiment of the present invention.

FIG. 2 shows the method of counting the number of bytes of received segments according to an embodiment of the present invention.

In FIG. 2, a TCP transmitting side 21 can count the number of bytes of received segments (rcv_bytes) for which the receiving side acknowledges the reception according to the information about the Ack received from a TCP receiving side 22 within the time of the minimum value of an RTT (rtt_min).

Practically, the number of bytes of received segments (rcv_bytes) can be counted as follows.

When SAck Option is Supported:

Available is the value obtained by subtracting the sequence number of the leading segment that has not received an Ack (drs_snd_una) from the maximum sequence number (rcv_ack) received by a receiving terminal by the Ack received within a time of the minimum value of an RTT (rtt_min).

During the retransmission of a segment, the value obtained by subtracting the total number of bytes (sack_start) of the segments notified by the Sack option when the counting is started from the total number of bytes (sack_end) of the segments notified by the SAck option of the received Ack is added to the initial value to consider the total number of bytes of the segments retransmitted within the time of the minimum value of an RTT (rtt_min).

That is, rcv_bytes=rcv_ack−drs_snd_una+(sack_end−sack_start).

When there occurs no segment loss, both seck_end and sack_start are 0, rcv_bytes=rcv_ack−drs_snd_una. When a segment loss is cleared within the time of the minimum value of an RTT (rtt_min), sack_end is 0, and only sack_start becomes valid.

SAck Option is Not Support:

In this case, the number of bytes of received segments (rcv_bytes) can be counted with the number of the duplicate Ack (the Ack subsequent to the minimum segment (snd_una) for which Ack has not been received) taken into account.

That is, available is the value obtained by subtracting the sequence number of the leading segment that has not received an Ack (drs_snd_una) for which the Ack has not been received when the counting is started from the sequence number (rcv_ack) for which the reception is notified to the receiving terminal by the Ack last received within the time of the minimum value of an RTT (rtt_min).

In addition, during the retransmission of a segment, the value obtained by subtracting the number of received duplicate Ack in the time of the minimum value of an RTT (rtt_min)×MSS (dack_end) from the number of duplicate Ack received when the counting is started×MSS (dack_start) is added to the initial value to consider the total number of bytes of the retransmitted segments.

That is, rcv_bytes=rcv_ack−drs_snd_una+(dack_end_dack_start).

When no segment loss occurs, both dack_end and dack_start become 0.

When a queuing delay occurs in an Ack path, there can be a case in which the number of bytes of received segments (rcv_bytes) cannot be counted with high accuracy depending on the situation. Therefore, using the transmission time of the Ack, the number of bytes of received segments (rcv_bytes) can be counted with accuracy without a queuing delay of the Ack path.

Figure 3:
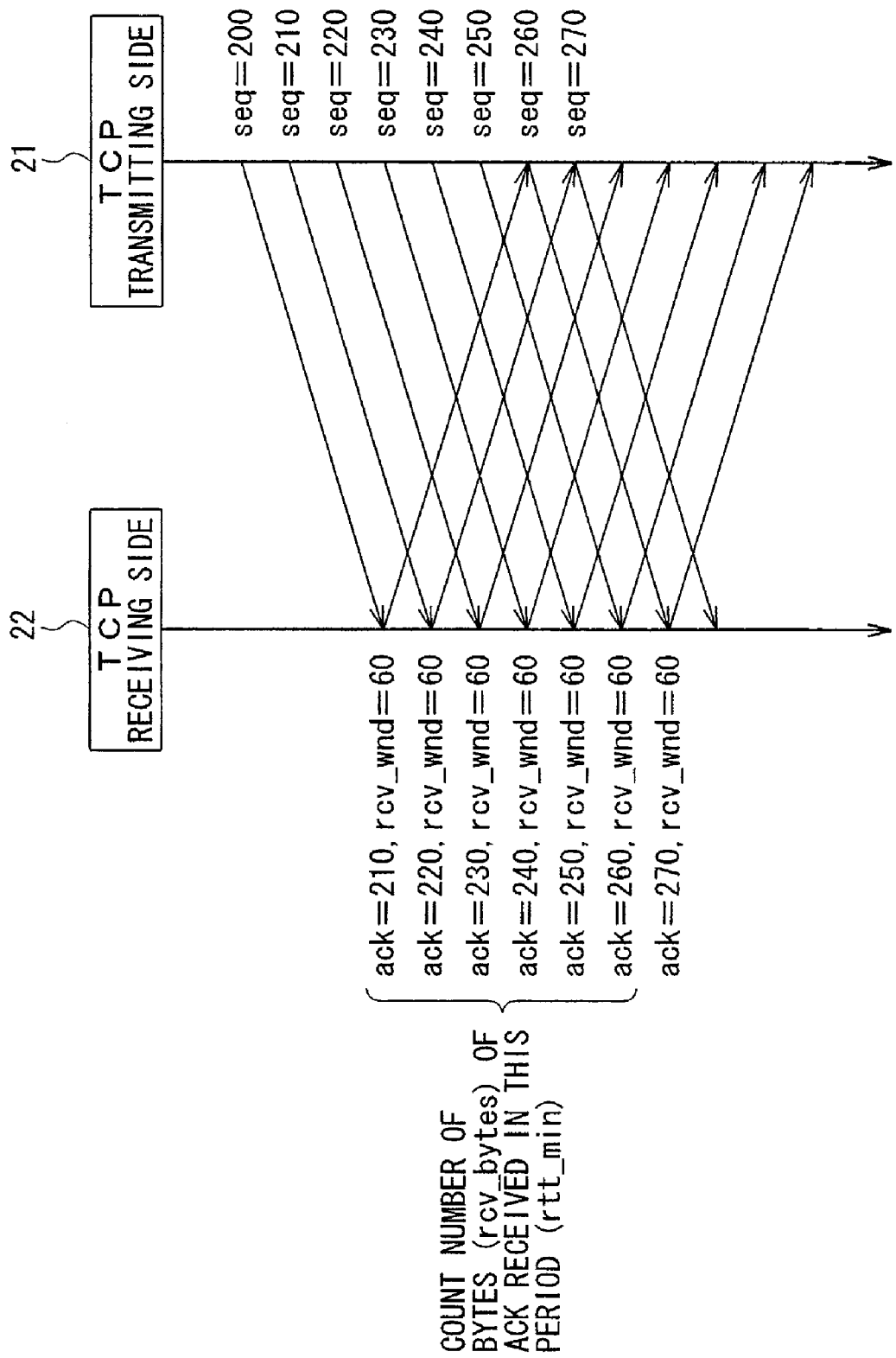
FIG. 3 show another example of the method of counting the number of bytes of received segments according to an embodiment of the present invention.

FIG. 3 shows another example of the method of counting the number of bytes of received segments according to an embodiment of the present invention.

In FIG. 3, when a Timestamp option is added as on the TCP transmitting side 21 in the Ack, the number of bytes of received segments (rcv_bytes) can be counted by referring to the transmission time of the Ack transmitted within the time of the minimum value of an RTT (rtt_min). When the grading of the Timestamp option is different between the receiving side and the transmitting side, it is necessary to correct the transmission time of the Ack on the transmitting side.

Figure 4:
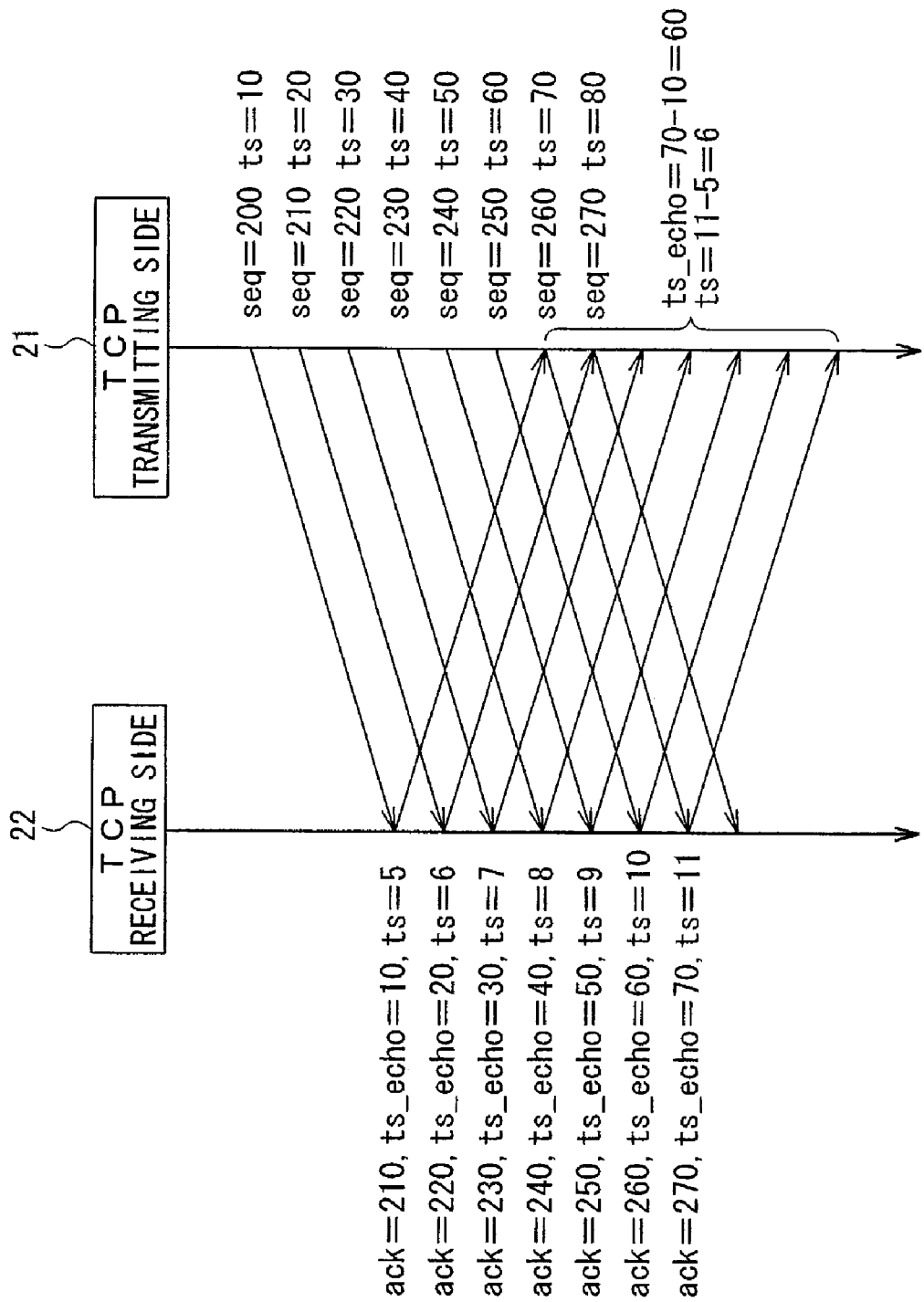
FIG. 4 shows an example of correcting the transmission time of an Ack on the transmitting side.

FIG. 4 shows an example of correcting the transmission time of the Ack on the transmitting side.

In FIG. 4, ts indicates a transmission time, and ts_echo indicates Timestamp Echo. On the transmitting side, when the Ack is received, a predetermined period is counted, the increase amount of the ts and ts_echo of the Ack received in the period is counted and used in an amendment. In FIG. 4, the amount of the increase of ts_echo is 60 while the amount of the increase of ts is 6. Therefore, rcv_bytes is counted by the Ack up to the time obtained by adding 1/10 of the minimum value of an RTT (rtt_min) to the transmission time of the Ack when the counting is started.

When the number of bytes of received segments (rcv_bytes) exceeds the previously counted number of bytes of received segments (rcv_bytes), the value can be updated each time an Ack is received. Regardless of the increase or decrease of the number of bytes of received segments (rcv_bytes), the number of bytes of received segments (rcv_bytes) can be counted again in each period of minimum value of an RTT (rtt_min). Furthermore, by setting a lower end of the number of bytes of received segments (rcv_bytes), the number of bytes of received segments (rcv_bytes) can be prevented from being set to an extremely small value.

The loss detection unit 15 shown in FIG. 1 detects a packet loss based on a retransmission timeout (RTO) or a duplicate acknowledgment (duplicate Ack).

Next, when the loss detection unit 15 detects a packet loss, the received byte number setting unit 16 shown in FIG. 1 can set a congestion window (CWND) or a slow start threshold (SSTHRESH) when a packet loss occurs based on the number of bytes of received segments (rcv_bytes) counted by the received byte number counting unit 14.

Practically, the received byte number setting unit 16 can set a congestion window (CWND) or a slow start threshold (SSTHRESH) as follows when a packet loss occurs.

1. At FF (fast retransmit & fast recovery):

$SSTHRESH = MAX(rcv\_bytes, CWND/2)$

Set $CWND = SSTHRESH$

2. When RTO (retransmit timeout) occurs:

$SSTHRESH = MAX(rcv\_bytes, CWND/2)$ $CWND = 1 \times MSS$

When the number of bytes of received segments (rcv_bytes) falls below CWND+α (constant) of the number of bytes of received segments (rcv_bytes), a packet is lost although no packet resides in a network. Therefore, it is determined that the packet loss has been caused by a factor other than the congestion in the network, thereby setting the slow start threshold (SSTHRESH) to the value obtained before the loss was detected. A value used in the method for common TCP can be used for the congestion window (CWND).

Next, the segment transmission unit 17 shown in FIG. 1 transmits a segment according to the congestion window (CWND) and the slow start threshold (SSTHRESH) set in the received byte number setting unit 16.

The minimum time counting unit 13, the received byte number counting unit 14, the loss detection unit 15, and the received byte number setting unit 16 can be realized by allowing a computer to execute the program describing an instruction to perform the processes carried out by the units above to execute.

When the program is stored in a storage medium such as CD-ROM etc., the computer of the transmitting terminal 11 is loaded with the storage medium, and the program is installed on the computer, thereby realizing the processes performed by the minimum time counting unit 13, the received byte number counting unit 14, the loss detection unit 15, and the received byte number setting unit 16. By downloading the program over a network, the program can be easily propagated.

The above-mentioned embodiment describes the method of setting a congestion window or a slow start threshold when a packet loss occurs according to the number of bytes of segments counted by the received byte number counting unit 14 on the transmitting side. However, by counting on the receiving side the number of bytes of the segments for which the receiving side acknowledges the reception, and transmitting to the transmitting side the number of bytes of the segments counted on the receiving side, the congestion window or the slow start threshold when a packet loss occurs can be set.

Although the above-mentioned embodiment describes the method of setting on the transmitting side a congestion window or a slow start threshold when a packet loss occurs according to the number of bytes of the segments for which the receiving side acknowledges the reception, a congestion window or a slow start threshold when a packet loss occurs can be counted on the receiving side according to the number of bytes of the segments for which the receiving side acknowledges the reception, and the congestion window or the slow start threshold when a packet loss occurs counted on the receiving side can be transmitted to the transmitting side, thereby setting on the transmitting side a congestion window or a slow start threshold when a packet loss occurs.

What is claimed is:

1. A communication terminal, comprising:
   a received byte number counting unit configured to count on a transmitting side a number of bytes of segments for which a receiving side acknowledges reception of the segments based on an acknowledgment transmitted from the receiving side; and a received byte number setting unit configured to set a congestion window or a slow start threshold when a packet loss occurs based on the number of bytes of segments counted by the received byte number counting unit;

wherein at fast retransmission and fast recovery, the received byte number setting unit sets a number of bytes of segments counted by the received byte number counting unit or a half number of congestion windows whichever is larger as a slow start threshold, and sets the slow start threshold in the congestion window;

and wherein at retransmission timeout, the received byte number setting unit sets a number of bytes of segments counted by the received byte number counting unit or a half number of congestion windows whichever is larger as a slow start threshold, and sets a maximum segment size that the transmitting side can transmit in the congestion window.

2. A communication terminal, comprising:

a minimum time counting unit configured to count a minimum value of an RTT;

a received byte number counting unit configured to count on a transmitting side the number of bytes of segments for which the receiving side acknowledges reception of the segments based on an acknowledgment transmitted from the receiving side in a period of the minimum value of an RTT counted by the minimum time counting unit;

a loss detection unit configured to detect a packet loss based on a retransmission timeout or a duplicate acknowledgment; and a received byte number setting unit configured to set a congestion window or a slow start threshold when a packet loss occurs based on the number of bytes of segments counted by the received byte number counting unit;

wherein at fast retransmission and fast recovery, the received byte number setting unit sets a number of bytes of segments counted by the received byte number counting unit or a half number of congestion windows whichever is larger as a slow start threshold, and sets the slow start threshold in the congestion window;

and wherein at retransmission timeout, the received byte number setting unit sets a number of bytes of segments counted by the received byte number counting unit or a half number of congestion windows whichever is larger as a slow start threshold, and sets a maximum segment size that the transmitting side can transmit in the congestion window.

3. A congestion control method, comprising:

counting, by a communication terminal, on a transmitting side a number of bytes of segments for which a receiving side acknowledges reception of the segments based on an acknowledgment transmitted from the receiving side; and setting, by the communication terminal, a congestion window or a slow start threshold when a packet loss occurs based on the number of bytes of segments counted on the transmitting side:

wherein at fast retransmission and fast recovery, the received byte number setting unit sets a number of bytes of segments counted by the received byte number counting unit or a half number of congestion windows whichever is larger as a slow start threshold, and sets the slow start threshold in the congestion window;

and wherein at retransmission timeout, the received byte number setting unit sets a number of bytes of segments counted by the received byte number counting unit or a half number of congestion windows whichever is larger as a slow start threshold, and sets a maximum segment size that the transmitting side can transmit in the congestion window.

4. A non-transitory computer-readable storage medium storing a program causing a communication terminal to execute a process, the process comprising:

counting, by a communication terminal, on a transmitting side a number of bytes of segments for which a receiving side acknowledges reception of the segments based on an acknowledgment transmitted from the receiving side; and setting, by the communication terminal, a congestion window or a slow start threshold when a packet loss occurs based on the number of bytes of segments counted on the transmitting side;

wherein at fast retransmission and fast recovery, the received byte number setting unit sets a number of bytes of segments counted by the received byte number counting unit or a half number of congestion windows whichever is larger as a slow start threshold, and sets the slow start threshold in the congestion window;

and wherein at retransmission timeout, the received byte number setting unit sets a number of bytes of segments counted by the received byte number counting unit or a half number of congestion windows whichever is larger as a slow start threshold, and sets a maximum segment size that the transmitting side can transmit in the congestion window.

* * * * *